United States Patent
Wu et al.

(10) Patent No.: US 12,399,105 B2
(45) Date of Patent: Aug. 26, 2025

(54) STRUCTURAL INTELLIGENT FORCE-MEASUREMENT APPARATUS AND IN-SITU CALIBRATION METHOD

(71) Applicant: SICHUAN SUNLIGHT INSPECTION AND TESTING CO., LTD., Sichuan (CN)

(72) Inventors: Dacheng Wu, Sichuan (CN); Jianming Wang, Sichuan (CN); Yijun Zou, Sichuan (CN); Yu Deng, Sichuan (CN)

(73) Assignee: Dacheng Wu, Chengdu (CN)

( * ) Notice: Subject to any disclaimer, the term of this patent is extended or adjusted under 35 U.S.C. 154(b) by 304 days.

(21) Appl. No.: 18/033,348

(22) PCT Filed: Mar. 18, 2021

(86) PCT No.: PCT/CN2021/081402
§ 371 (c)(1),
(2) Date: Apr. 23, 2023

(87) PCT Pub. No.: WO2022/083054
PCT Pub. Date: Apr. 28, 2022

(65) Prior Publication Data
US 2023/0393053 A1    Dec. 7, 2023

(30) Foreign Application Priority Data

Oct. 23, 2020  (CN) .......................... 202011148106.8
Dec. 18, 2020  (CN) .......................... 202023075458.3
(Continued)

(51) Int. Cl.
*G01N 19/00*     (2006.01)
*E01D 19/04*     (2006.01)
(Continued)

(52) U.S. Cl.
CPC .............. *G01N 19/02* (2013.01); *G01L 25/00* (2013.01)

(58) Field of Classification Search
CPC .. G01N 3/08; G01N 3/32; G01N 3/20; G01N 3/04; G01N 3/00; G01N 19/04;
(Continued)

(56) References Cited

U.S. PATENT DOCUMENTS

| | | | | |
|---|---|---|---|---|
| 4,848,478 A | * | 7/1989 | Hafner | ..................... G01L 25/00 73/1.13 |
| 2018/0238771 A1 | * | 8/2018 | Ehmke | ..................... B61K 9/08 |

FOREIGN PATENT DOCUMENTS

| | | | | | |
|---|---|---|---|---|---|
| CN | 2415054 Y | * | 1/2001 | | |
| CN | 112748067 A | * | 5/2021 | ............. | G01L 5/168 |

(Continued)

*Primary Examiner* — Andre J Allen

(57) ABSTRACT

A method for calibrating an in-service bridge force-measurement bearing on the basis of accurate determination of a coefficient of friction includes steps of A1: recording a value of a horizontal or lateral force applied to a force measurement apparatus, and recording a horizontal or lateral force value of a sensing apparatus (5) before the force measurement apparatus is lifted; then applying a horizontal or lateral force to two wedge-shaped load transducers (3), and recording a horizontal or lateral force value of the sensing apparatus (5) during the change in height or during a pause in the change; A2: deriving a relational expression of a coefficient of friction, an angle of inclination of the load transducers (3) and a horizontal or lateral force; and A3: calculating a value of the coefficient of friction according to the recorded horizontal or lateral force values and the relational expression in A2.

10 Claims, 8 Drawing Sheets

(30) Foreign Application Priority Data

Dec. 23, 2020 (CN) .......................... 202011538900.3
Dec. 23, 2020 (CN) .......................... 202011538911.1

(51) Int. Cl.
*G01L 25/00* (2006.01)
*G01N 19/02* (2006.01)

(58) Field of Classification Search
CPC ............. G01N 2203/0282; G01N 3/10; G01N 2203/0023; G01N 2203/0017; G01N 3/24; G01N 2203/0073; G01N 2203/028; G01N 3/02; G01N 2203/0016; G01N 2203/0278; G01N 2203/0222; G01N 2203/0019; G01N 2291/02827; G01N 2203/0226; G01N 3/06; G01N 2203/0296; G01N 33/383; G01N 3/14; G01N 2203/0005; G01N 3/12; G01N 2203/0025; G01N 33/24; G01N 3/34; G01N 2203/0066; G01N 3/42; G01N 3/18; G01N 2203/027; G01N 29/14; G01N 2203/0405; G01N 2203/0623; G01N 2203/0048; G01N 3/56; G01N 3/066; G01N 3/40; G01N 2203/0071; G01N 2203/0274; G01N 3/38; G01N 3/36; G01N 3/22; G01N 2203/0021; G01N 2203/0033; G01N 2203/0246; G01N 3/068; G01N 2203/0075; G01N 2203/0682; G01N 2203/0037; G01N 3/30; G01N 33/388; G01N 2203/0067; G01N 2203/0676; G01N 2203/0286; G01N 2203/0256; G01N 2203/0244; G01N 2203/0094; G01N 3/16; G01N 2203/0254; G01N 2203/0647; G01N 2203/0284; G01N 2203/0062; G01N 2203/0617; G01N 2203/0051; G01N 33/42; G01N 2203/021; G01N 2203/0089; G01N 2203/0298; G01N 29/227; G01N 2203/0085; G01N 2203/0208; G01N 29/07; G01N 2203/0091; G01N 2203/0218; G01N 2203/0092; G01N 2203/0064; G01N 2203/0042; G01N 2203/0435; G01N 2203/0039; G01N 19/08; G01N 2203/005; G01N 1/286; G01N 3/303; G01N 17/00; G01N 2203/0044; G01N 2291/0231; G01N 33/346; G01N 33/365; G01N 2203/0411; G01N 3/28; G01N 19/02; G01N 2203/0026; G01N 11/00; G01N 11/14; G01N 2203/04; G01N 33/442; G01N 2203/0292; G01N 3/062; G01N 2203/0003; G01N 33/46; G01N 33/367; G01N 2203/024; G01N 2203/0664; G01N 33/386; G01N 2203/0288; G01N 2291/044; G01N 29/11; G01N 33/445; G01N 3/60; G01N 3/565; G01N 2203/001; G01N 2291/2691; G01N 33/0078; G01N 2203/0447; G01N 2203/0035; G01N 2203/0087; G01N 2203/0098; G01N 2203/0266; G01N 2291/0258; G01N 2203/0641; G01N 29/12; G01N 2203/0258; G01N 2203/0688; G01N 2203/0007; G01N 27/72; G01N 11/165; G01N 29/2418; G01N 3/62; G01N 33/38; G01N 2203/0242; G01N 33/34; G01N 33/44; G01N 2203/0028; G01N 2291/02854; G01N 2291/0422; G01N 2203/0252; G01N 27/205; G01N 2203/0055; G01N 2203/0206; G01N 2291/0421; G01N 33/36; G01N 2203/0224; G01N 3/26; G01N 19/00; G01N 2203/0248; G01N 2203/0476; G01N 33/008; G01N 2203/0423; G01N 29/045; G01N 29/2412; G01N 33/15; G01N 2203/0658; G01N 11/142; G01N 2203/0494; G01N 2203/0216; G01N 27/20; G01N 2203/0212; G01N 2291/011; G01N 2203/0008; G01N 2203/0214; G01N 2203/0268; G01N 2291/02872; G01N 27/725; G01N 29/223; G01N 3/307; G01N 11/10; G01N 2203/0032; G01N 2203/0264; G01N 2291/2694; G01N 29/30; G01N 3/48; G01N 3/58; G01N 2203/006; G01N 2203/0082; G01N 2291/0427; G01N 33/20; G01N 33/4833; G01N 2203/0694; G01N 11/162; G01N 13/00; G01N 2203/0441; G01N 2203/0482; G01N 25/72; G01N 29/043; G01N 2203/0041; G01N 2203/0635; G01N 2291/048; G01N 2291/106; G01N 2203/0057; G01N 2203/0452; G01N 2203/0605; G01N 33/0081; G01N 33/0091; G01N 9/36; G01N 11/16; G01N 2203/0053; G01N 2203/0069; G01N 2203/0228; G01N 17/02; G01N 2291/101; G01N 2291/102; G01N 27/24; G01N 33/02; G01N 15/0826; G01N 19/10; G01N 2203/0429; G01N 2291/015; G01N 2291/0423; G01N 25/16; G01N 29/2475; G01N 3/319; G01N 2291/0232; G01N 33/32; G01N 17/006; G01N 2203/0012; G01N 2203/0096; G01N 203/0276; G01N 29/4427; G01N 29/46; G01N 3/064; G01N 21/21; G01N 2203/0076; G01N 2291/267; G01N 29/2437; G01N 2203/008; G01N 2203/0234; G01N 2291/0251; G01N 2291/2695; G01N 3/165; G01N 33/10; G01N 33/26; G01N 11/04; G01N 15/08; G01N 21/88; G01N 2203/0204; G01N 2291/02881; G01N 27/223; G01N 29/348; G01N 33/222; G01N 33/54373; G01N 2291/0237; G01N 2291/0289; G01N 3/313; G01N 3/567; G01N 33/2045; G01N 35/00871; G01N 2203/0464; G01N 23/207; G01N 29/4418; G01N 3/46; G01N 33/0083; G01N 15/0806; G01N 2203/0629; G01N 2291/0238; G01N 2291/02863; G01N 29/24; G01N 29/343; G01N 33/0077; G01N 33/0086; G01N 2203/0236; G01N 2203/0272; G01N 27/9046; G01N 29/222; G01N 3/31; G01N 3/405; G01N 5/04; G01N 11/02; G01N 21/95; G01N 2203/023; G01N 2203/0232; G01N 2203/029; G01N 2203/0417; G01N 2291/014; G01N 2291/0235; G01N 2291/103; G01N 23/046; G01N 27/82; G01N 33/204; G01N 15/088; G01N 21/8806; G01N 21/91; G01N 2203/06; G01N 2291/2623; G01N 2291/2693; G01N 23/20; G01N 25/00; G01N 27/041; G01N 29/42; G01N 29/4472; G01N 33/0003; G01N 33/241; G01N 1/04; G01N 13/02; G01N 2013/0216; G01N 2203/0238; G01N 2203/026; G01N 2223/419; G01N 2291/02416; G01N 2291/02466; G01N 2291/105; G01N 2291/2634; G01N 29/04; G01N 29/069; G01N 29/28; G01N 33/025; G01N 33/12; G01N 21/1702; G01N 2203/0262; G01N 2203/047; G01N 2291/02836; G01N 27/04; G01N 29/036; G01N 29/326; G01N 29/4436; G01N 33/00; G01N 1/28; G01N 1/32; G01N 21/01; G01N 21/70; G01N 21/952; G01N 2203/0078; G01N 2203/0652; G01N 2291/02491; G01N 2291/265; G01N 25/04; G01N 27/90; G01N 29/022; G01N 29/4445; G01N 33/0096; G01N 33/30; G01N 33/447; G01N 35/00; G01N 5/02; G01N 17/002; G01N 2001/021; G01N 2021/8472; G01N 21/1717; G01N 21/8422; G01N 2203/0046; G01N 2203/0458; G01N 2291/2675; G01N 2291/269; G01N 27/22; G01N 27/902; G01N 29/024; G01N 29/041; G01N 29/048; G01N 29/22; G01N 29/228; G01N 29/245; G01N 29/262; G01N 29/4463; G01N 29/449; G01N 3/52; G01N 3/54; G01N 33/48; G01N 33/54346; G01N 35/04; G01N 5/00; G01N 15/00; G01N 17/043; G01N 2015/0096; G01N 21/64; G01N 2203/0202; G01N 2291/02441; G01N 2291/0256; G01N 2291/02818; G01N 2291/2672; G01N 27/904; G01N 27/9053; G01N 29/09; G01N 29/221; G01N 29/36; G01N 3/44; G01N 33/0095; G01N 33/2823; G01N 7/10; G01N 9/00; G01N 1/00; G01N 11/08; G01N 15/02; G01N 15/082; G01N 17/046; G01N 19/06; G01N 2001/2873; G01N 2013/006; G01N 2015/0846; G01N 2035/00881; G01N 2035/0441; G01N 21/211; G01N 21/31; G01N 21/954; G01N 2203/003; G01N 2203/025; G01N 2203/0611; G01N 2291/0428; G01N 2291/2626; G01N 2291/2636; G01N 23/083; G01N 23/2251; G01N 25/18; G01N 27/9006; G01N 29/0672; G01N 29/225; G01N 29/2481; G01N 29/4454; G01N 29/48; G01N 29/50; G01N 33/2022; G01N 35/0099; G01N 35/028; G01N 9/02; G01N 17/04; G01N 2001/025; G01N 2001/366; G01N 2011/0033; G01N 2015/0873; G01N 2015/1006; G01N 2015/1495; G01N 2015/0497; G01N 2021/1725; G01N 21/171; G01N 21/43; G01N 21/7703; G01N 21/8803; G01N 21/9501; G01N 21/9508; G01N 21/958; G01N 2201/0233; G01N 2203/0083; G01N 2203/022; G01N 2291/0234; G01N 2291/0255; G01N 2291/2632; G01N 23/18; G01N 24/081; G01N 25/20; G01N 25/4846; G01N 27/048; G01N 27/121; G01N 27/225; G01N 29/00; G01N 29/02; G01N 29/032; G01N 29/0681; G01N 29/075; G01N 29/265; G01N 29/323; G01N 29/44; G01N 3/50; G01N 33/0009; G01N 33/04; G01N 33/343; G01N 33/487; G01N 33/49; G01N 33/4905; G01N 35/0098; G01N 35/02; G01N 1/2202; G01N 1/2226; G01N 1/24; G01N 1/2813; G01N 15/04; G01N 2001/2223; G01N 2001/2866; G01N 2011/0026; G01N 2015/0038; G01N 2015/0092; G01N 2035/00772; G01N 21/0303; G01N 21/0317; G01N 21/15; G01N 21/25; G01N 21/27; G01N 21/47; G01N 21/8915; G01N 2201/06113; G01N 2203/00; G01N 2203/067; G01N 2291/0226; G01N 2291/02845; G01N 2291/0426; G01N 2291/056; G01N 2291/2698; G01N 23/04; G01N 23/203; G01N 24/08; G01N 24/085; G01N 24/087; G01N 25/02; G01N 25/12; G01N 25/4866; G01N 27/02; G01N 27/023; G01N 27/026; G01N 27/12; G01N 27/62; G01N 29/06; G01N 29/0609; G01N 29/2462; G01N 29/38; G01N 29/4409; G01N 31/22; G01N 33/009; G01N 33/1873; G01N 33/362; G01N 33/40; G01N 33/48735; G01N 35/025; G01N 5/025; G01N 9/24; G01N 1/02; G01N 1/08; G01N 1/18; G01N 1/2035; G01N 1/22; G01N 11/12; G01N 11/167; G01N 15/06; G01N 15/10; G01N 15/1031; G01N 15/1425; G01N 15/1433; G01N 15/1456; G01N 15/1468; G01N 15/147; G01N 2001/022; G01N 2001/028; G01N 2001/388; G01N 2011/002; G01N 2011/0066; G01N 2011/008; G01N 2011/0086; G01N 2013/0225; G01N 2013/0233; G01N 2021/036; G01N 2021/0389; G01N 2021/1706; G01N 2021/1708; G01N 2021/1787; G01N 2021/3595; G01N 2021/5969; G01N 2021/646; G01N 2021/7786; G01N 2021/7796; G01N 2021/8427; G01N 2021/8438; G01N 2021/8444; G01N 2021/8822; G01N 2021/8829; G01N 2021/8838; G01N 2021/8874; G01N 2021/8887; G01N 2035/00039; G01N 2035/00108; G01N 2035/00336; G01N 2035/00376; G01N 2035/00683; G01N 2035/00782; G01N 2035/00841; G01N 2035/00851; G01N 2035/0091; G01N 21/17; G01N 21/23; G01N 21/251; G01N 21/255; G01N 21/29; G01N 21/33; G01N 21/3581; G01N 21/45; G01N 21/453; G01N 21/57; G01N 21/636; G01N 21/6428; G01N 21/714; G01N 21/78; G01N 21/84; G01N 21/8483; G01N 21/8851; G01N 21/93; G01N 21/9503; G01N 21/9505; G01N 21/956; G01N 21/95684; G01N 22/02; G01N 22/04; G01N 2201/102; G01N 2201/13; G01N 2223/053; G01N 2223/09; G01N 2223/6116; G01N 2223/616; G01N
2291/018; G01N 2291/0224; G01N
2291/02408; G01N 2291/02433; G01N
2291/0245; G01N 2291/025; G01N
2291/104; G01N 2291/2638; G01N
2291/2696; G01N 2291/2697; G01N
23/06; G01N 27/002; G01N 27/07; G01N
27/126; G01N 27/18; G01N 27/221;
G01N 27/226; G01N 27/227; G01N
27/228; G01N 27/3271; G01N 27/4067;
G01N 27/4071; G01N 27/4073; G01N
27/4145; G01N 27/42; G01N 27/447;
G01N 27/44743; G01N 27/44773; G01N
27/74; G01N 27/83; G01N 27/84; G01N
27/85; G01N 27/9013; G01N 29/0645;
G01N 29/0663; G01N 29/2406; G01N
29/2425; G01N 29/2456; G01N 29/26;
G01N 29/27; G01N 29/34; G01N 29/346;
G01N 29/40; G01N 29/4481; G01N
29/52; G01N 3/562; G01N 31/221; G01N
33/0027; G01N 33/0031; G01N 33/0085;
G01N 33/0098; G01N 33/08; G01N
33/18; G01N 33/205; G01N 33/208;
G01N 33/246; G01N 33/4875; G01N
33/54353; G01N 33/54366; G01N
33/569; G01N 33/6848; G01N 35/00009;
G01N 35/00712; G01N 7/00; G01N 9/04;
G01N 9/08; G01N 9/10; G01N 9/12;
G01N 9/20; G01N 1/2208; G01N 1/2211;
G01N 1/2806; G01N 1/36; G01N 1/38;
G01N 1/4022; G01N 1/42; G01N 1/44;
G01N 13/04; G01N 15/01; G01N
15/0266; G01N 15/0606; G01N
2001/383; G01N 2001/386; G01N
2001/4033; G01N 2013/0283; G01N
2015/019; G01N 2015/0261; G01N
2015/1022; G01N 2021/1704; G01N
2021/213; G01N 2021/4166; G01N
2021/434; G01N 2021/9518; G01N
2030/322; G01N 2035/00188; G01N
2035/00198; G01N 2035/00217; G01N
21/00; G01N 21/41; G01N 21/4133;
G01N 2203/0058; G01N 2203/02; G01N
2223/04; G01N 2223/056; G01N
2223/1016; G01N 2223/108; G01N
2223/309; G01N 2223/311; G01N
2223/321; G01N 2223/418; G01N
2223/607; G01N 2223/62; G01N
2223/632; G01N 2223/646; G01N
2223/649; G01N 2291/0254; G01N
2291/043; G01N 23/02; G01N 23/201;
G01N 25/68; G01N 27/00; G01N 27/127;
G01N 29/0618; G01N 29/2431; G01N
29/2487; G01N 31/005; G01N 33/0006;
G01N 33/0093; G01N 33/207; G01N
33/22; G01N 33/245; G01N 33/2841;
G01N 33/39; G01N 33/574; G01N
33/00594; G01N 35/00603; G01N 5/045;
G01L 1/18; G01L 1/125; G01L 1/2287;
G01L 5/24; G01L 1/2206; G01L 1/16;
G01L 1/225; G01L 1/2281; G01L 1/2293;
G01L 1/24; G01L 1/20; G01L 1/22;
G01L 1/142; G01L 1/127; G01L 5/0033;
G01L 1/14; G01L 5/0047; G01L 1/26;
G01L 5/0004; G01L 1/242; G01L 1/241;
G01L 1/246; G01L 1/2231; G01L 1/2262;
G01L 5/0076; G01L 5/0038; G01L 1/005;
G01L 5/00; G01L 1/2218; G01L 5/246;
G01L 3/102; G01L 5/243; G01L 1/205;
G01L 9/0054; G01L 1/255; G01L 5/102;
G01L 3/105; G01L 5/0052; G01L 5/10;
G01L 5/162; G01L 5/0061; G01L 5/0042;
G01L 9/0042; G01L 1/2268; G01L
9/0055; G01L 25/00; G01L 9/065; G01L
1/2243; G01L 5/0019; G01L 1/144; G01L
5/101; G01L 1/04; G01L 1/162; G01L
5/103; G01L 5/0057; G01L 5/1627; G01L
1/2225; G01L 1/247; G01L 1/00; G01L
5/165; G01L 3/10; G01L 1/2212; G01L
3/108; G01L 5/0085; G01L 5/107; G01L
9/0052; G01L 5/161; G01L 1/10; G01L
1/12; G01L 11/02; G01L 1/02; G01L
1/06; G01L 1/106; G01L 1/148; G01L
11/025; G01L 5/228; G01L 1/146; G01L
1/165; G01L 1/245; G01L 9/0002; G01L
19/147; G01L 5/06; G01L 1/2237; G01L
5/04; G01L 5/047; G01L 9/0073; G01L
9/0075; G01L 1/2256; G01L 5/225; G01L
9/0072; G01L 1/243; G01L 25/003; G01L
9/0051; G01L 1/248; G01L 19/0092;
G01L 5/0028; G01L 5/042; G01L 5/045;
G01L 5/108; G01L 5/223; G01L 1/25;
G01L 5/008; G01L 5/167; G01L 9/045;
G01L 9/16; G01L 3/12; G01L 5/106;
G01L 5/12; G01L 9/0022; G01L 9/0098;
G01L 9/06; G01L 1/183; G01L 19/04;
G01L 1/2275; G01L 5/22; G01L 5/226;
G01L 9/04; G01L 5/16; G01L 5/0071;
G01L 5/136; G01L 19/148; G01L 9/0019;
G01L 19/02; G01L 5/0009; G01L 9/002;
G01L 3/103; G01L 3/104; G01L 5/28;
G01L 9/007; G01L 9/12; G01L 1/186;
G01L 19/0084; G01L 23/18; G01L 5/105;
G01L 19/086; G01L 3/242; G01L 5/221;
G01L 9/0001; G01L 9/0061; G01L 1/044;
G01L 1/122; G01L 5/0066; G01L 5/08;
G01L 9/125; G01L 9/0035; G01L 1/042;
G01L 23/10; G01L 3/101; G01L 19/0038;
G01L 3/24; G01L 5/0014; G01L 5/009;
G01L 5/133; G01L 5/164; G01L 9/006;
G01L 9/0077; G01L 9/008; G01L 9/08;
G01L 13/025; G01L 3/106; G01L 3/1457;
G01L 5/14; G01L 19/0636; G01L 19/146;
G01L 9/0041; G01L 1/103; G01L 27/002;
G01L 3/1428; G01L 3/1478; G01L 5/13;
G01L 9/0014; G01L 9/0079; G01L 9/10;
G01L 1/167; G01L 11/04; G01L 19/0645;
G01L 19/14; G01L 3/00; G01L 3/045;
G01L 3/1435; G01L 9/0005; G01L
9/0013; G01L 9/0025; G01L 9/0048;
G01L 9/0076; G01L 19/0007; G01L
19/083; G01L 3/14; G01L 3/1485;
3/247; G01L 5/26; G01L 7/00; G01L
9/005; G01L 9/0064; G01L 11/00; G01L
11/06; G01L 17/005; G01L 19/003; G01L
27/005; G01L 5/03; G01L 9/02; G01L
1/046; G01L 11/006; G01L 17/00; G01L
19/0061; G01L 19/08; G01L 25/006;
G01L 3/02; G01L 3/04; G01L 3/08;
G01L 3/109; G01L 5/0023; G01L 5/169;

G01L 7/024; G01L 7/16; G01L 9/0023;
G01L 13/023; G01L 19/00; G01L
19/0046; G01L 23/08; G01L 23/22; G01L
3/1471; G01L 5/166; G01L 5/18; G01L
5/20; G01L 7/082; G01L 7/18; G01L
9/00; G01L 9/0004; G01L 9/0027; G01L
9/0047; G01L 9/14; G01L 9/18; G01L
1/048; G01L 1/08; G01L 1/083; G01L
1/086; G01L 11/008; G01L 19/0069;
G01L 19/0618; G01L 19/0627; G01L
19/141; G01L 19/143; G01L 19/145;
G01L 19/16; G01L 21/00; G01L 21/02;
G01L 21/20; G01L 23/02; G01L 23/12;
G01L 23/16; G01L 27/00; G01L 3/1414;
G01L 3/1464; G01L 3/16; G01L 3/22;
G01L 5/163; G01L 5/286; G01L 7/04;
G01L 7/043; G01L 7/08; G01L 7/084;
G01L 7/10; G01L 9/0007; G01L 9/0008;
G01L 9/0017; G01L 9/0038; G01L
9/0044; G01L 9/0045; G01L 9/0082;
G01L 9/0083; G01L 9/0086; G01L
9/0092; G01L 9/025; G01L 15/00; G01L
19/0023; G01L 19/0654; G01L 19/0681;
G01L 19/069; G01L 19/142; G01L
23/222; G01L 3/1492; G01L 3/18; G01L
5/1623; G01L 5/171; G01L 5/173; G01L
7/02; G01L 7/022; G01L 7/166; G01L
9/003; G01L 9/0036; G01L 9/105; E01D
19/04

See application file for complete search history.

(56) References Cited

FOREIGN PATENT DOCUMENTS

| | | | | | |
|---|---|---|---|---|---|
| CN | 113155727 | A | * | 7/2021 | ............. E01D 19/04 |
| CN | 114166401 | A | * | 3/2022 | |
| CN | 118310667 | A | * | 7/2024 | |
| CN | 118424552 | A | * | 8/2024 | |
| EP | 0270123 | A2 | * | 6/1988 | |
| JP | 2012078286 | A | * | 4/2012 | ............. G01L 25/00 |

* cited by examiner

A1: Record a value of a horizontal or lateral force applied to a force measurement apparatus, this step comprising three situations of a1, a2, and a3:

a1: first record a horizontal or lateral force value of a sensing apparatus before the force measurement apparatus is lifted; and then apply, by a power apparatus, a horizontal or lateral force to two wedge-shaped load transducers on the force measurement apparatus to change a height of the force measurement apparatus, and record a horizontal or lateral force value of the sensing apparatus during the change in height or during a pause in the change;

a2: first apply a horizontal or lateral force to two wedge-shaped load transducers on the force measurement apparatus to change a height of the force measurement apparatus, and record a horizontal or lateral force value of a sensing apparatus during the change in height or during a pause in the change; then accurately adjust a gap between the two load transducers, to tightly attach the sensing apparatus to the load transducers; and release a power apparatus, and record a horizontal or lateral force value measured by the sensing apparatus between the two load transducers at this time; and a3: first apply a horizontal or lateral force to two wedge-shaped load transducers to change a height of the force measurement apparatus, and record a horizontal or lateral force value of a sensing apparatus during the change in height or during a pause in the change; and then reduce the value of the horizontal or lateral force applied to the two wedge-shaped load transducers to change the height of the force measurement apparatus, and record a horizontal or lateral force value of the sensing apparatus during the change in height or during a pause in the change

A2: Derive a relational expression of a coefficient of friction, an angle of inclination of the load transducers and a horizontal or lateral force according to a mechanical equilibrium relationship between forces applied to the load transducers

A3: Calculate a value of the coefficient of friction according to the recorded horizontal or lateral force values and the relational expression in A2

FIG. 1

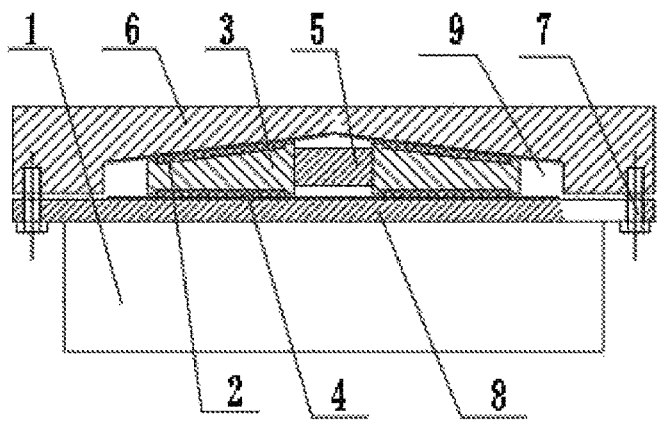

FIG. 2

STRUCTURAL INTELLIGENT FORCE-MEASUREMENT APPARATUS AND IN-SITU CALIBRATION METHOD

BACKGROUND OF THE PRESENT INVENTION

Field of Invention

The present invention relates to the technical field of rail transit structural engineering, can further be applied to the structural engineering fields of highways, municipal administration, buildings, and the like, and particularly relates to a determination method for accurately determining a coefficient of friction between a force measurement apparatus and a bearing.

Description of Related Arts

A force measurement apparatus and a bearing are used to determine a force applied to a force transmission member between structures, and are widely used in various fields, especially in the field of bridge engineering. The force measurement apparatus is used as a main force transmission member between an upper structure and a lower structure of a bridge structure, and a change in the force applied to the force measurement apparatus can reflect an overall operation situation of the bridge to a large extent, to implement acquisition of monitoring data of a bridge bearing, i.e., bridge vertical reaction, which can provide a technical basis for bridge health monitoring. As the construction of highway and railway bridges in China increases year by year, monitoring of vertical static loads and dynamic loads of bridge bearings is of great practical significance for operation of bridges.

As for a wedge-shaped height-adjustment force measurement apparatus, since a wedge block is inevitably worn during operation, and considering aging performance of the material itself, a coefficient of friction of the wedge-shaped height-adjustment force measurement apparatus may change. When a vertical force is reversely deduced by measuring a horizontal force of a wedge-shaped mechanism of the force measurement apparatus, the change in the coefficient of friction affects the accuracy of the vertical force because the solution of the vertical force is related to the coefficient of friction. Therefore, the coefficient of friction needs to be determined on site. However, currently, there is no mature solution to the problem of determining a coefficient of friction of a wedge-shaped force measurement apparatus.

SUMMARY OF THE PRESENT INVENTION

An objective of the present invention is to provide a determination method for accurately determining a coefficient of friction between a force measurement apparatus and a bearing, to solve the problem of inaccurate measurement of a vertical force due to the fact that a coefficient of friction of a wedge-shaped height-adjustment force measurement apparatus in service cannot be accurately determined.

To solve the above technical problem, a solution adopted by the present invention is as follows:
  a method for calibrating an in-service bridge force-measurement bearing on the basis of accurate determination of a coefficient of friction, the method comprising the following steps:

A1: recording a value of a horizontal or lateral force applied to a force measurement apparatus, this step comprising two situations of a1 and a2:

a1: first recording a horizontal or lateral force value of a sensing apparatus before the force measurement apparatus is lifted; and then applying, by a power apparatus, a horizontal or lateral force to two wedge-shaped load transducers on the force measurement apparatus to change a height of the force measurement apparatus, and recording a horizontal or lateral force value of the sensing apparatus during the change in height or during a pause in the change;

a2: first applying a horizontal or lateral force to two wedge-shaped load transducers on the force measurement apparatus to change a height of the force measurement apparatus, and recording a horizontal or lateral force value of a sensing apparatus during the change in height or during a pause in the change; then accurately adjusting a gap between the two load transducers, to tightly attach the sensing apparatus to the load transducers; and releasing a power apparatus, and recording a horizontal or lateral force value measured by the sensing apparatus between the two load transducers at this time; and a3: first applying a horizontal or lateral force to two wedge-shaped load transducers to change a height of the force measurement apparatus, and recording a horizontal or lateral force value of a sensing apparatus during the change in height or during a pause in the change; and then reducing the value of the horizontal or lateral force applied to the two wedge-shaped load transducers to change the height of the force measurement apparatus, and recording a horizontal or lateral force value of the sensing apparatus during the change in height or during a pause in the change;

A2: deriving a relational expression of a coefficient of friction, an angle of inclination of the load transducers and a horizontal or lateral force according to a mechanical equilibrium relationship between forces applied to the load transducers in a1 or a2 or a3; and A3: calculating a value of the coefficient of friction according to the horizontal or lateral force values recorded in a1 or a2 or a3 and the relational expression in A2.

Preferably, the method further comprises step A4: deriving a relational expression of a vertical force, the angle of inclination of the load transducers, the horizontal or lateral force and the coefficient of friction according to the mechanical equilibrium relationship between the forces applied to the load transducers in a1 or a2 or a3, and accurately calculating a vertical force value of the force measurement apparatus in combination with the value of the coefficient of friction obtained in A3.

Preferably, in a1, a2 and a3, the force measurement apparatus used comprises an upper adjusting plate and a lower adjusting plate, a bearing core is arranged above the upper adjusting plate or below the lower adjusting plate, a bottom surface of the upper adjusting plate is provided with an adjusting chamber, the two wedge-shaped load transducers are arranged in the adjusting chamber, one or more sensing apparatuses are arranged between the two load transducers, the force measurement apparatus is provided with the power apparatus, an output end of the power apparatus is connected in series to the sensing apparatus(es) and is then in contact with a side portion and/or an end portion of one of the load transducers, a fixed end of the power apparatus is connected to a side portion and/or an end portion of the other load transducer, the power apparatus outputs a horizontal or lateral force to push the two load transducers away from each other, so that power output is paused when a height of the upper adjusting plate rises to a set elevation, and at this time, the value of the horizontal or lateral force applied by the power apparatus is capable of being directly measured by the sensing apparatus(es) connected in series to the output end.

Preferably, a limiting apparatus(es) is/are provided on one side or two sides of each sensing apparatus, each limiting apparatus is an adjusting screw, and the adjusting screw is in threaded connection with the corresponding load transducer; in step a2, after the power apparatus relatively moves the two load transducers away each other, the height of the force measurement apparatus rises to a set elevation, and a gap is formed between the two load transducers; and by means of the adjusting screw, the sensing apparatus is adjusted to be tightly attached to the load transducers, and after the horizontal or lateral force applied by the power apparatus is released, the sensing apparatus between the two load transducers accurately measures the horizontal or lateral force value at this time.

Preferably, a locking apparatus is arranged between the sensing apparatus and the adjusting screw, and the locking apparatus is a steel plate, section steel, round steel, angle steel, a steel pipe, or a concrete block. An appropriate number of locking apparatuses may be selected based on an actual situation on site, so that the locking apparatuses are adjustable and easy to operate.

Preferably, two ends of the sensing apparatus are provided with matching fixing seats, the fixing seats are located between the sensing apparatus and the limiting apparatus, and one or more groups of fixing seats are provided.

Preferably, the limiting apparatus is two wedge blocks, inclined surfaces of the two wedge blocks match and are attached to each other, and by means of mutual sliding of the two wedge blocks, the sensing apparatus is adjusted to be tightly attached to the load transducers. The two wedge blocks may accurately adjust a gap between the sensing apparatus and the load transducer by sliding up and down or back and forth relative to each other, so that the sensing apparatus is tightly attached to the load transducer. By using a lever principle of the wedge blocks, a larger transverse force (which force is in a horizontal direction) can be obtained from a smaller force (which force is in the same direction as the sliding direction of the two wedge blocks), thereby achieving the purpose of tightly attaching the sensing apparatus to the load transducer, making the adjustment faster and saving time and labor.

Preferably, a1 in A1 is implemented by means of another structure in which the force measurement apparatus comprises a bearing core, a lower seat plate, and two load transducers, wherein a bottom surface of the bearing core is in contact with top surfaces of the two load transducers in the form of an oblique straight surface or a cylindrical surface or a curved surface, a plurality of sensing apparatuses are arranged between each load transducer and a side wall of the lower seat plate in a horizontal direction, and the sensing apparatuses record horizontal or lateral force values.

Preferably, a power apparatus is installed on either side wall of the lower seat plate, and an output end of the power apparatus passes through the side wall of the lower seat plate and is in direct or indirect contact with the sensing apparatuses; the power apparatus applies a horizontal or lateral force such that the sensing apparatuses are pressed and the two load transducers move close to each other to jack up the bearing core; a value of the horizontal or lateral force applied to the sensing apparatuses is recorded when a height of the bearing core starts to change or the change is paused; a load distribution baffle is arranged between the output end of the power apparatus and the sensing apparatuses, the output end of the power apparatus is in contact with a side face of the load distribution baffle, and the sensing apparatuses are located between the load distribution baffle and the respective load transducer; and an adjustable limiting block is installed between the load distribution baffle and the side wall of the lower seat plate.

Preferably, the bearing core is placed in a bottom basin having a basin cavity structure, a force measurement carrier is arranged between the bearing core and the bottom basin, a sensing apparatus is arranged on a side face of the force measurement carrier, and the sensing apparatus is connected to an external data acquisition system via a signal line.

Preferably, the top surfaces of the load transducers are in contact with a top surface of the adjusting chamber in the form of oblique straight surfaces or cylindrical surfaces or curved surfaces, the bottom surfaces of the load transducers are in contact with an upper supporting surface of the lower adjusting plate in the form of planar or curved surfaces or oblique straight surfaces, a matching upper friction pair and lower friction pair are respectively arranged between the top surface of the adjusting chamber and the top surfaces of the load transducers, and between the bottom surfaces of the load transducers and the top surface of the lower adjusting plate, and each power apparatus is a hydraulic cylinder, a pneumatic cylinder or a mechanical transmission mechanism.

The present invention has the following beneficial effects.
1. According to the present invention, a relational expression of a coefficient of friction, a horizontal or lateral force and an angle of inclination of the load transducers is derived according to a mechanical equilibrium relationship between forces applied to the load transducers, and the coefficient of friction is accurately obtained. A vertical force is accurately calculated according to a derived relational expression of the vertical force, the angle of inclination of the load transducers, the horizontal or lateral force and the coefficient of friction. According to this method, the coefficient of friction can be accurately determined when the force measurement apparatus and the bearing are in service, so that the vertical force can be accurately calculated, and the vertical force of the bearing is quickly and accurately calibrated, thereby ensuring accurate monitoring of the force applied to the bearing during an operation period, and improving the safety of the bridge structure.
2. According to this method, the gap between the two load transducers can be accurately adjusted by means of an adjusting screw or wedge blocks, so that a sensing apparatus is tightly attached to the load transducers, and thus the height of the apparatus does not change in the two equilibrium relational expressions. The unchanged height means that a load on an upper portion does not change, so that the value of the coefficient of friction calculated based on the unchanged height of the apparatus is more accurate, and the calibration of the vertical force is also more accurate.

BRIEF DESCRIPTION OF THE DRAWINGS

FIG. 1 is a schematic flow structure diagram of the present invention.
FIG. 2 is a schematic structural diagram of the present invention.

LIST OF REFERENCE NUMERALS

Figure 3:
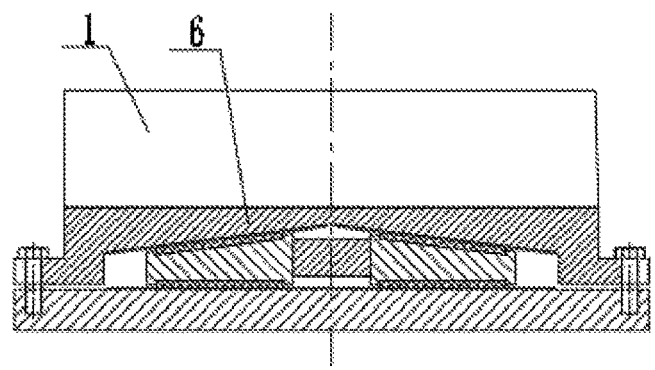
FIG. 3 is a schematic structural diagram, with a bearing core being located above an upper adjusting plate.
Figure 4:
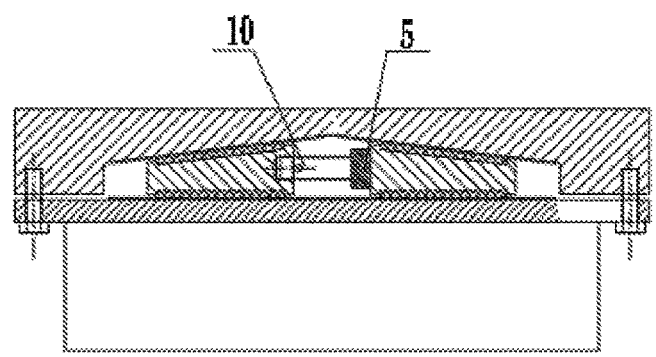
FIG. 4 is a schematic structural diagram of series connection of an adjusting screw and a sensor.
Figure 5:
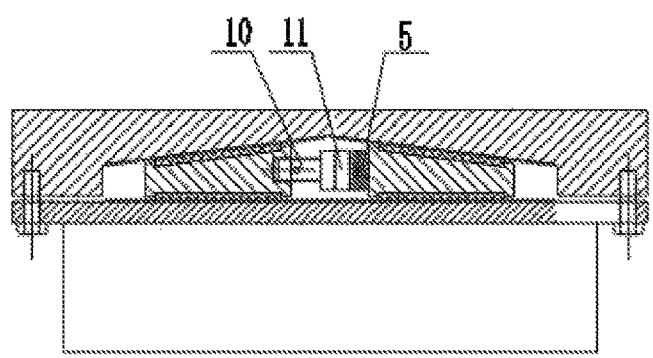
FIG. 5 is a schematic structural diagram, with a locking apparatus being provided.
Figure 6:
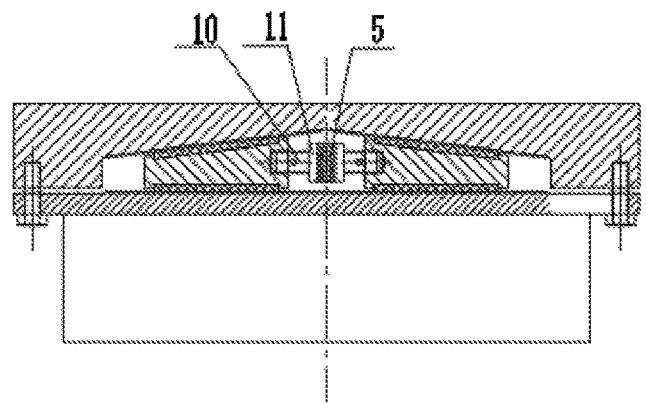
FIG. 6 is another schematic structural diagram of a locking apparatus and an adjusting screw.
Figure 7:
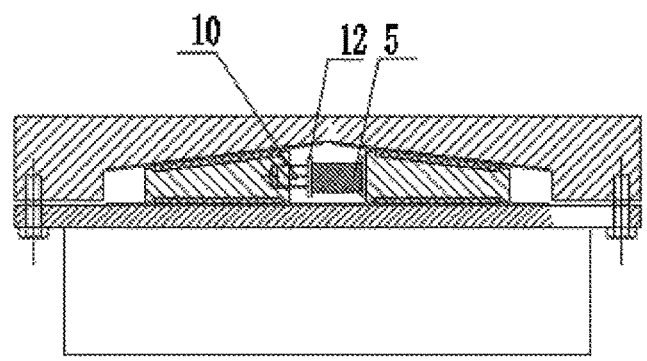
FIG. 7 is a schematic structural diagram, with fixing seats being provided.
Figure 8:
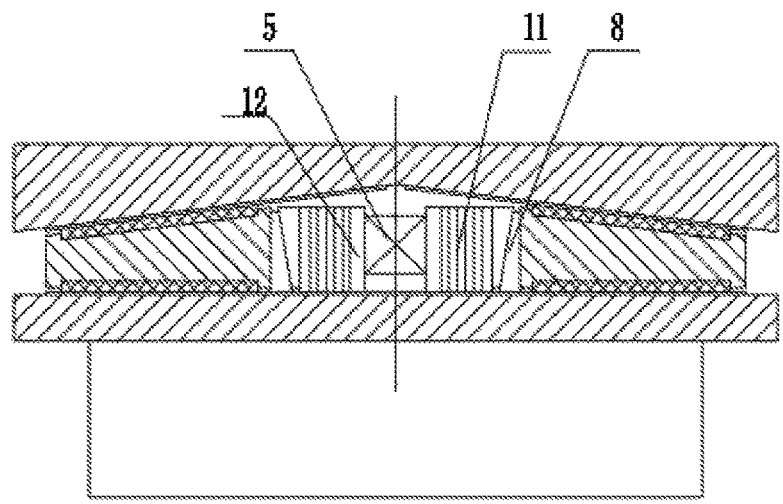
FIG. 8 is a structural diagram, with a limiting apparatus being wedge blocks.
Figure 9:
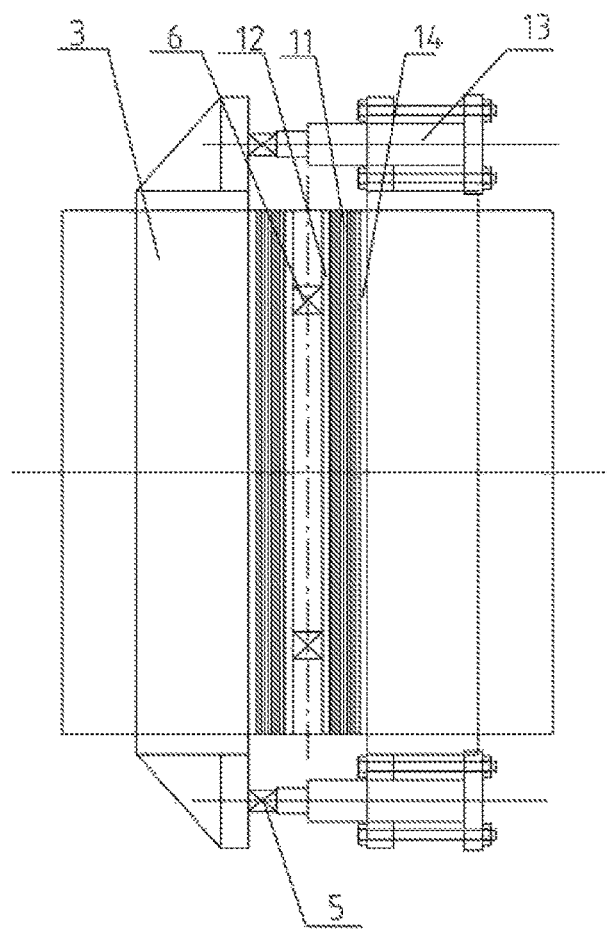
FIG. 9 is a structural diagram, with a power apparatus being added to FIG. 8.
Figure 10:
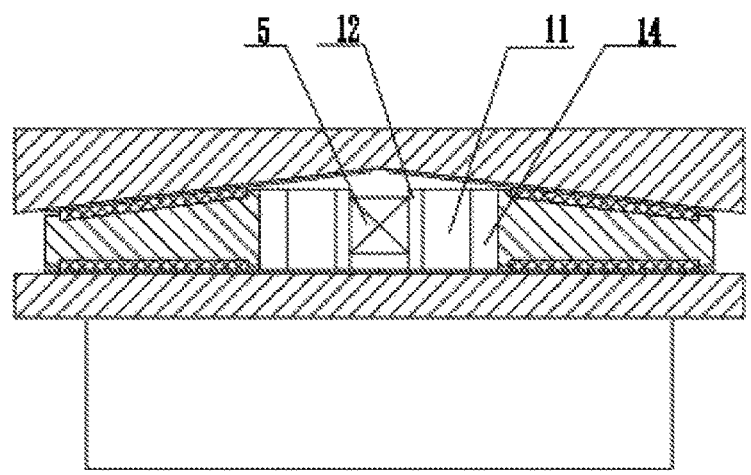
FIG. 10 is a schematic diagram of another sliding structure of two wedge blocks.
Figure 11:
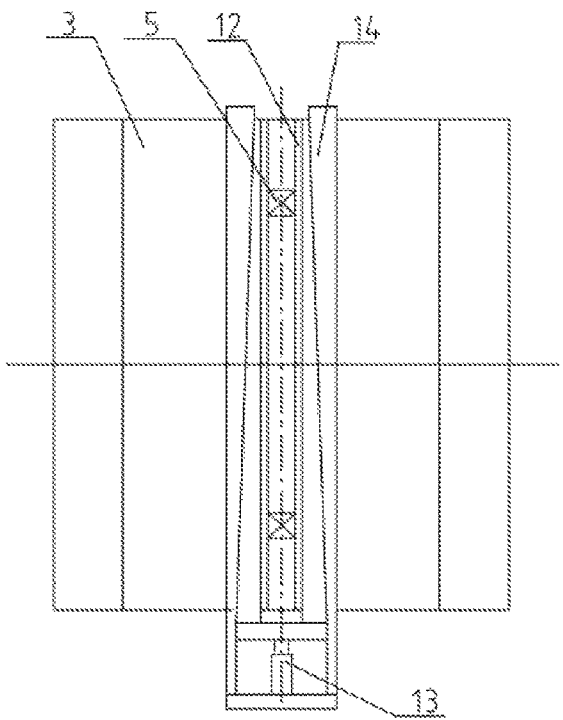
FIG. 11 is a schematic structural diagram, with wedge blocks being connected to a power apparatus.
Figure 12:
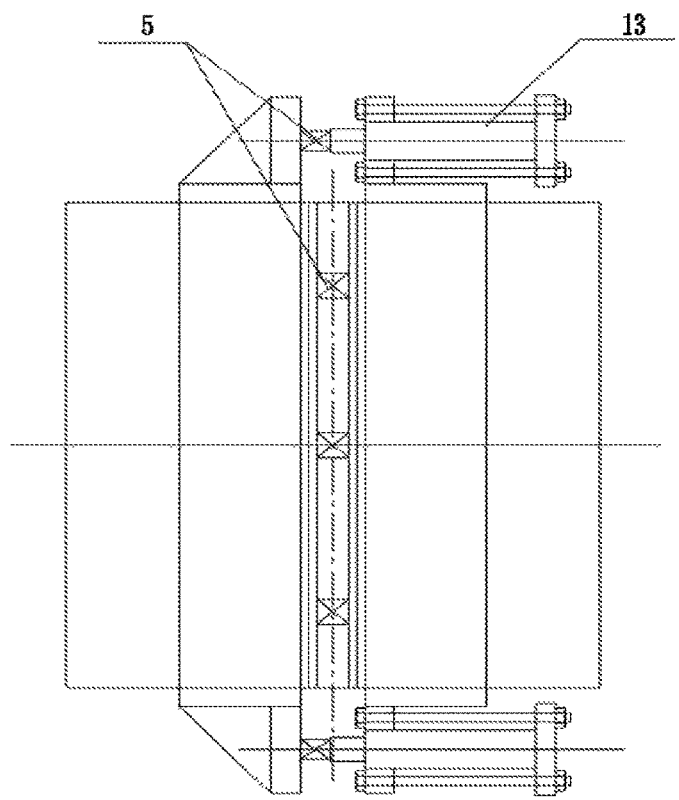
FIG. 12 is a structural diagram, with a power apparatus being connected in FIG. 2.
Figure 13:
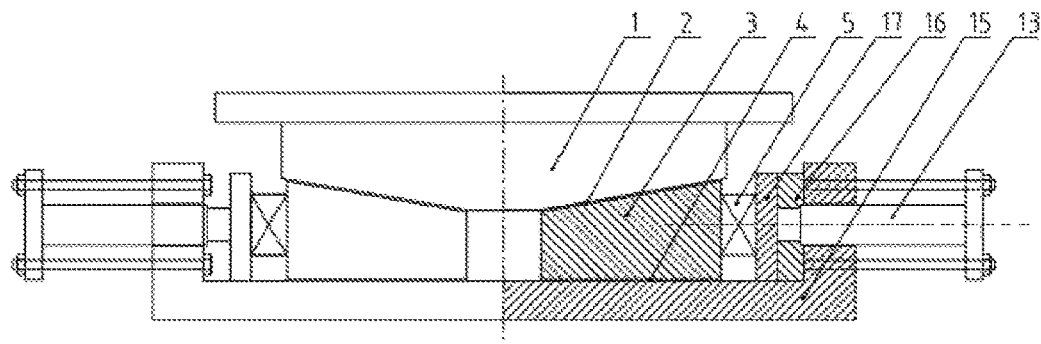
FIG. 13 is a schematic structural diagram in Embodiment 9.
Figure 14:
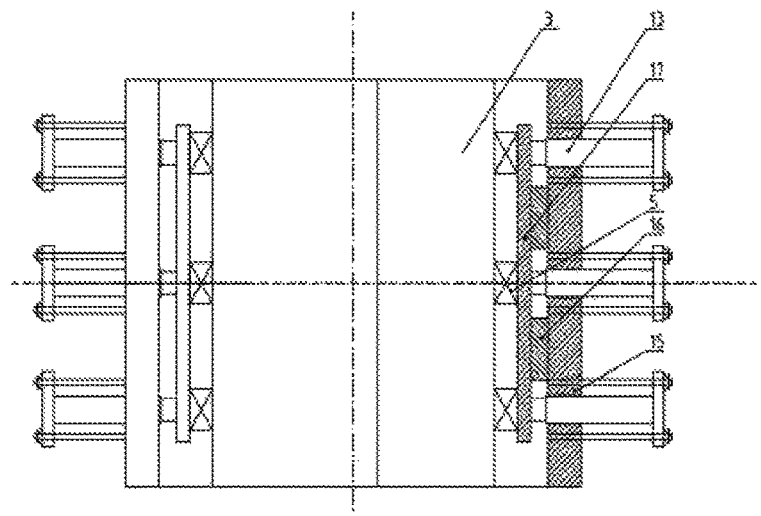
FIG. 14 is a structural diagram, with three power apparatuses being provided in Embodiment 9.
Figure 15:
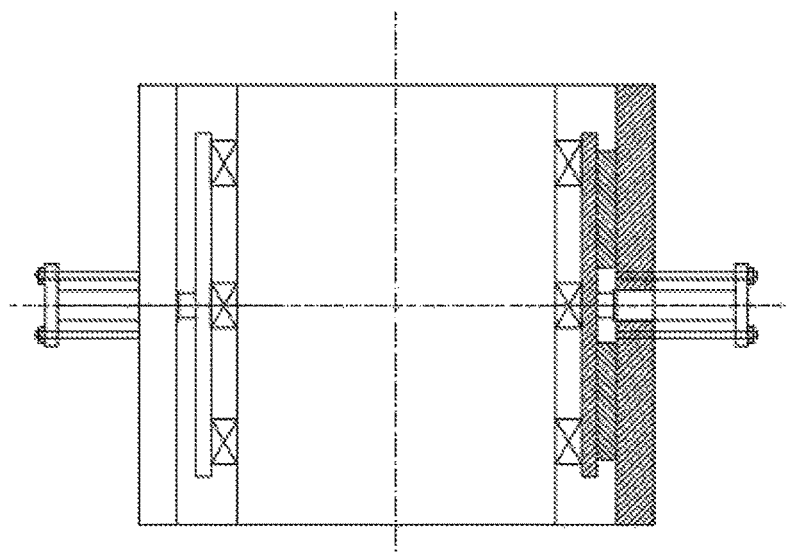
FIG. 15 is a structural diagram, with one power apparatus being provided in Embodiment 9.
Figure 16:
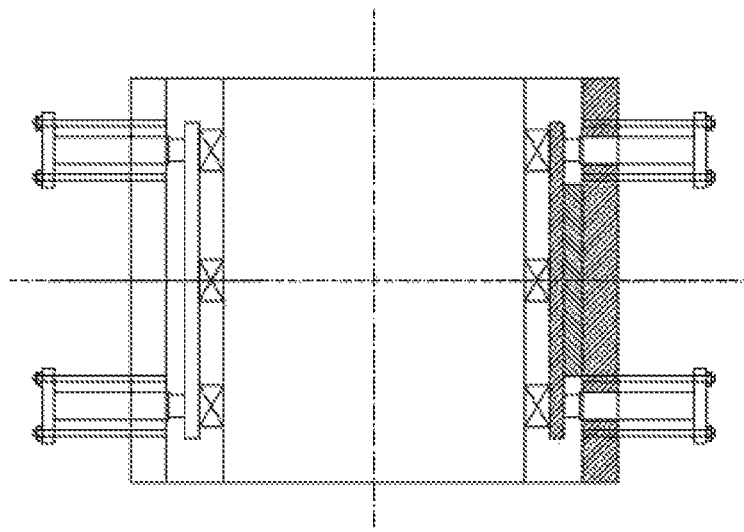
FIG. 16 is a structural diagram, with two power apparatuses being provided in Embodiment 9.
Figure 17:
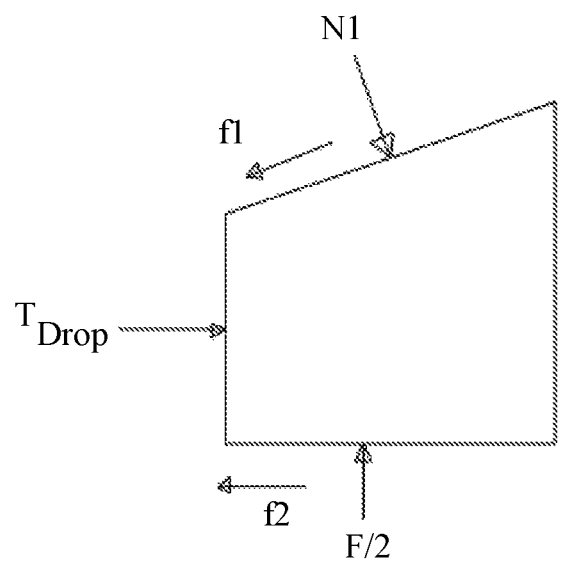
FIG. 17 is a free-body diagram of forces applied to a load transducer, with a height of a force measurement apparatus dropping.
Figure 18:
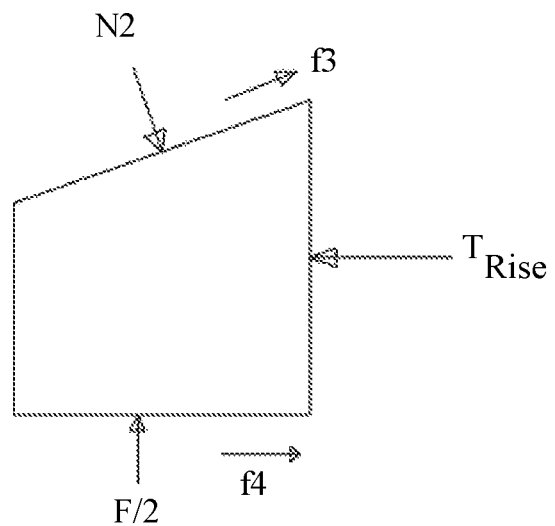
FIG. 18 is a free-body diagram of forces applied to a load transducer, with a force measurement apparatus rising at a high speed.

1—bearing core, 2—upper friction pair, 3—load transducer, 4—lower friction pair, 5—sensing apparatus, 6—upper adjusting plate, 7—bolt, 8—lower adjusting plate, 9—adjusting chamber, 10—adjusting screw, 11—locking apparatus, 12—fixing seat, 13—power apparatus, 14—wedge block, 15—lower seat plate, 16—adjustable limiting block, 17—load distribution baffle, 18—bottom basin, 19—force measurement carrier, 20—data acquisition system.

DETAILED DESCRIPTION OF THE PREFERRED EMBODIMENT

The present invention will be further described in detail below with reference to embodiments and the accompanying drawings, but implementations of the present invention are not limited thereto.

In the description of the present invention, it should be noted that an orientation or positional relationship indicated by the term "centre", "upper", "lower", "left", "right", "vertical", "longitudinal", "lateral", "horizontal", "inner", "outer", "front", "rear", "top", "bottom" or the like is based on the orientation or positional relationship shown in the accompanying drawings, or the orientation or positional relationship in which a product of the present invention is conventionally placed when in use, and are intended to facilitate the description of the present invention and simplify the description only, rather than indicating or implying that the device or element referred to must have a particular orientation or be constructed and operated in a particular orientation, and will not to be interpreted as limiting the present invention.

In the description of the present invention, it should be further noted that unless otherwise explicitly specified and defined, the terms "arrange", "provided with", "install", "connected", and "connection" should be understood in a broad sense and, for example, may be a fixed connection, a detachable connection, or an integrated connection; or may be a mechanical connection or an electrical connection; or may be a direct connection, an indirect connection by means of an intermediate medium, or internal communication between two elements. For a person of ordinary skill in the art, the specific meanings of the terms mentioned above in the present invention should be construed according to specific circumstances.

Embodiment 1

A method for calibrating an in-service bridge force-measurement bearing on the basis of accurate determination of a coefficient of friction comprises the following steps.

In step A1, a value of a horizontal or lateral force applied to a force measurement apparatus is recorded, this step comprising two methods of a1 and a2.

In the first method a1, a horizontal or lateral force value $T_{Drop}$ of a sensing apparatus 5 before the force measurement apparatus is lifted is first recorded. A power apparatus 13 then applies a horizontal or lateral force to two wedge-shaped load transducers 3 on the force measurement apparatus to change a height of the force measurement apparatus, the two load transducers 3 move away from each other, the height of the force measurement apparatus rises, and a horizontal or lateral force value $T_{Rise}$ of the sensing apparatus 5 during the change in height or during a pause in the change is recorded.

In the second method a2, a power apparatus 13 first applies a horizontal or lateral force to two wedge-shaped load transducers 3 on the force measurement apparatus, the two load transducers 3 move away from each other to rise the height of the force measurement apparatus, and a horizontal or lateral force value $T_{Rise}$ of the sensing apparatus 5 during the change in height or during a pause in the change is recorded. A gap between the two load transducers 3 is then accurately adjusted, to tightly attach the sensing apparatus 5 to the load transducers 3. The power apparatus 13 is released, and a horizontal or lateral force value $T_{Drop}$ measured by the sensing apparatus 5 between the two load transducers 3 is recorded at this time.

In the third method a3, a horizontal or lateral force is first applied to two wedge-shaped load transducers 3 to rise a height of the force measurement apparatus, and a horizontal or lateral force value $T_{Rise}$ of a sensing apparatus 5 during the change in height or during a pause in the change is recorded. The value of the horizontal or lateral force applied to the two wedge-shaped load transducers 3 is then reduced to drop the height of the force measurement apparatus, and a horizontal or lateral force value $T_{Drop}$ of the sensing apparatus 5 during the change in height or during a pause in the change is recorded.

A2: A relational expression of a coefficient of friction, an angle of inclination of the load transducers 3 and a horizontal or lateral force is derived according to a mechanical equilibrium relationship between forces applied to the load transducers in a1 or a2 or a3.

In step A3, a value of the coefficient of friction is calculated according to the horizontal or lateral force values recorded in a1 or a2 or a3 and the relational expression in A2.

Specifically, in a1, a vertical force applied to the force measurement apparatus is F, vertical forces transmitted to the two wedge-shaped transducers 3 from this vertical force are respectively F/2, friction forces applied to upper and lower sliding surfaces of the load transducers 3 are respectively f1 and f2, the upper sliding surface is subjected to a pressing force N1 perpendicular thereto, the lower sliding surface is subjected to a vertical pressing force F/2, the forces applied to the load transducers 3 are decomposed, and the following is obtained according to a mechanical equilibrium relationship: f:1=$N_1 \times \mu_1$, f2=$\mu_2 \times$F/2, and $N_1$=F/2(cos $\theta + \mu_1 \times$sin $\theta$), wherein an equivalent coefficient of friction $\mu$ replaces the coefficients of friction $\mu_1$ and $\mu_2$ of the upper and lower sliding surfaces to obtain $$T_{Drop} = 0.5F \cdot \frac{\tan\theta - 2\mu - \mu^2 \tan\theta}{1 + \mu \tan\theta}.$$

After the power apparatus 13 applies a horizontal force, friction forces applied to the upper and lower sliding surfaces of the load transducers are respectively f3 and f4, the upper sliding surface is subjected to a pressing force N2 perpendicular thereto, the lower sliding surface is subjected to a vertical pressing force F/2, the forces applied to the load transducers 3 are decomposed, and the following is obtained according to a mechanical equilibrium relationship: f:3=$N_1 \times \mu_1$, f4=$\mu_2 \times$F/2, and $N_2$=F/2(cos $\theta - \mu_1 \times$sin $\theta$), wherein an equivalent coefficient of friction $\mu$ replaces the coefficients of friction $\mu_1$ and $\mu_2$ of the upper and lower sliding surfaces to obtain $$T_{Rise} = \frac{F}{2} \cdot \left| \frac{2\mu + \tan\theta - \mu^2 \tan\theta}{1 - \mu \tan\theta} \right|$$

($\theta$ is an angle of inclination of the load transducers).

$$\mu = \frac{T_{Rise} - T_{Drop}}{T_{Rise} + T_{Drop}} \cdot \frac{\tan\theta}{2 + \tan\theta^2}$$

can be obtained based on the two formulas of $T_{Rise}$ and $T_{Drop}$, $T_{Rise}$ and $T_{Drop}$ are directly obtained by the sensing apparatus 5, and the value of the coefficient of friction can be accurately calculated.

In a2, the power apparatus 13 first applies a horizontal force to move the two load transducers 3 away from each other, the height of the force measurement apparatus rises, and the horizontal force value $T_{Rise}$ is recorded at this time; friction forces applied to upper and lower sliding surfaces of the load transducers 3 are respectively f3 and f4, the upper sliding surface is subjected to a pressing force N2 perpendicular thereto, the lower sliding surface is subjected to a vertical pressing force F/2, the forces applied to the load transducers 3 are decomposed, and the following is obtained according to a mechanical equilibrium relationship: f:3=$N_1 \times \mu_1$, f4=$\mu_2 \times$F/2, and $N_2$=F/2(cos $\theta - \mu_1 \times$sin $\theta$), wherein an equivalent coefficient of friction $\mu$ replaces the coefficients of friction $\mu_1$ and $\mu_2$ of the upper and lower sliding surfaces to obtain $$T_{Rise} = \frac{F}{2} \cdot \left| \frac{2\mu + \tan\theta - \mu^2 \tan\theta}{1 - \mu \tan\theta} \right|$$

($\theta$ is an angle of inclination of the load transducers). Since the height of the force measurement apparatus rises to a set elevation after the two load transducers 3 relatively move away from each other, a gap is formed between the two load transducers 3. After the power apparatus 13 is released, a vertical load of an upper member completely acts on the force measurement apparatus. A limiting apparatus is used for adjustment to eliminate the gap between two load transducers 3. After the power apparatus 13 is released, relative displacement will not occur again because there is no gap between the two load transducers 3. At this time, the height of the force measurement apparatus is kept unchanged, and the sensing apparatus 5 between the two load transducers 3 measures the horizontal or lateral force value $T_{Drop}$ more accurately. At this time, friction forces applied to the upper and lower sliding surfaces of the load transducers 3 are respectively f1 and f2, the upper sliding surface is subjected to a pressing force N1 perpendicular thereto, the lower sliding surface is subjected to a vertical pressing force F/2, the forces applied to the load transducers 3 are decomposed, and the following is obtained according to a mechanical equilibrium relationship: f:1=$N_1 \times \mu_1$, f2=$\mu_2 \times$ F/2, and $N_1$=F/2(cos $\theta + \mu_1 \times$sin $\theta$), wherein an equivalent coefficient of friction $\mu$ replaces the coefficients of friction $\mu_1$ and $\mu_2$ of the upper and lower sliding surfaces to obtain $$T_{Drop} = 0.5F \cdot \frac{\tan\theta - 2\mu - \mu^2 \tan\theta}{1 + \mu \tan\theta},$$

$$\mu = \frac{T_{Rise} - T_{Drop}}{T_{Rise} + T_{Drop}} \cdot \frac{\tan\theta}{2 + \tan\theta^2}$$

can be obtained based on the two formulas of $T_{Rise}$ and $T_{Drop}$, $T_{Rise}$ and $T_{Drop}$ are directly obtained by the sensing apparatus 5, and the value of the coefficient of friction can be accurately calculated.

The mechanical equilibrium relational expression in a3 is the same as those in a1 and a2.

Embodiment 2

The method further comprises step A4, in which a relational expression of a vertical force, the angle of inclination of the load transducers 3, the horizontal or lateral force and the coefficient of friction is derived according to the mechanical equilibrium relationship between the forces applied to the load transducers 3 in a1 or a2 or a3, and a vertical force value of the force measurement apparatus is accurately calculated in combination with the value of the coefficient of friction obtained in A3.

Specifically, $$F = 2T_{Drop} \cdot \frac{1 + \mu \tan\theta}{\tan\theta - 2\mu - \mu^2 \tan\theta}$$

is obtained through the conversion of the relational expression of $T_{Drop}$, the calculated value of the coefficient of friction and the known horizontal force value are substituted into this relational expression, so that the accurate vertical force value is obtained, and the vertical force can be calibrated by means of the horizontal force.

Embodiment 3

In a1, a2, and a3, the force measurement apparatus used comprises an upper adjusting plate 6 and a lower adjusting plate 8, a bearing core 1 is arranged above the upper adjusting plate 6 or below the lower adjusting plate 8, a bottom surface of the upper adjusting plate 6 is provided with an adjusting chamber 9, and the two wedge-shaped load transducers 3 are arranged in the adjusting chamber 9. The top surfaces of the load transducers 3 are in contact with a top surface of the adjusting chamber 9 in the form of oblique straight surfaces or cylindrical surfaces or curved surfaces, the bottom surfaces of the load transducers 3 are in contact with an upper supporting surface of the lower adjusting plate 8 in the form of planar or curved surfaces or oblique straight surfaces, and a matching upper friction pair 2 and lower friction pair 4 are respectively arranged between the top surface of the adjusting chamber 9 and the top surfaces of the load transducers 3, and between the bottom surfaces of the load transducers 3 and the top surface of the lower adjusting plate. One or more sensing apparatuses 5 are arranged between the two load transducers 3, the force measurement apparatus is provided with a power apparatus 13, and the power apparatus 13 is a hydraulic cylinder, a pneumatic cylinder or a mechanical transmission mechanism. A hydraulic jack is used in this embodiment. An output end of the power apparatus 13 is connected in series to the sensing apparatus(es) 5 and is then in contact with a side portion and/or an end portion of one of the load transducers 3, a fixed end of the power apparatus 13 is connected to a side portion and/or an end portion of the other load transducer 3, the power apparatus 13 outputs a horizontal or lateral force to push the two load transducers 3 away from each other, so that power output is paused when a height of the upper adjusting plate 6 rises to a set elevation, and at this time, the value of the horizontal or lateral force applied by the power apparatus 13 can be directly measured by the sensing apparatus(es) 5 connected in series to the output end.

Embodiment 4

A limiting apparatus(es) is/are provided on one side or two sides of each sensing apparatus 5, and each limiting apparatus can eliminate the gap between the two load transducers 3, and ensure that the height of the force measurement apparatus will not change again after the force measurement apparatus reaches a set elevation. The limiting apparatus is an adjusting screw 10, and the adjusting screw 10 is in threaded connection with the corresponding load transducer 3. In step a2, after the power apparatus 13 relatively moves the two load transducers 3 away each other, the height of the force measurement apparatus rises to a set elevation, and a gap is formed between the two load transducers 3. By means of the adjusting screw 10, the sensing apparatus 5 is adjusted to be tightly attached to the load transducers 3, and after the horizontal or lateral force applied by the power apparatus 13 is released, the sensing apparatus 5 between the two load transducers 3 accurately measures the horizontal or lateral force value at this time.

Embodiment 5

A locking apparatus 11 is arranged between the sensing apparatus 5 and the adjusting screw 10, and the locking apparatus 11 is a steel plate, section steel, round steel, angle steel, a steel pipe, or a concrete block. An appropriate number of locking apparatuses 11 may be selected based on an actual situation on site, so that the locking apparatuses 11 are adjustable and easy to operate.

This embodiment further has another structure, in which two opposite ends of the two load transducers 3 are in threaded connection with adjusting screws 10, locking apparatuses 11 are respectively connected in series between two opposite end portions of the two adjusting screws 10, and a sensing apparatus 5 is arranged between two locking apparatuses 11.

Embodiment 6

In this embodiment, one end or two ends of each adjusting screw 10 is/are in threaded connection with the corresponding load transducer(s) 3, and a sensing apparatus is arranged between two adjusting screws 10 or connected in series to the free end of the adjusting screw 10.

Embodiment 7

Two ends of the sensing apparatus 5 are provided with matching fixing seats 12, the fixing seats 12 are located between the sensing apparatus 5 and the limiting apparatus, and one or more groups of fixing seats 12 are provided. That is, the fixing seats 12 may be separated or integrated. If the fixing seats are separated, each sensor apparatus 5 corresponds to one group of fixing seats 12. If the fixing seats are integrated, a plurality of sensing apparatuses 5 share one group of fixing seats 12.

Embodiment 8

In this embodiment, the limiting apparatus is in the form of two wedge blocks 14, inclined surfaces of the two wedge blocks 14 match and are attached to each other, and by means of mutual sliding of the two wedge blocks 14, the sensing apparatus 5 is adjusted to be tightly attached to the load transducers 3. The two wedge blocks 14 may accurately adjust a gap between the sensing apparatus 5 and the load transducer 3 by sliding up and down or back and forth relative to each other, so that the sensing apparatus 5 is tightly attached to the load transducer 6. By using a lever principle of the wedge blocks 14, a larger transverse force (which force is in a horizontal direction) can be obtained from a smaller force (which force is in the same direction as the sliding direction of the two wedge blocks 14), thereby achieving the purpose of tightly attaching the sensing apparatus 5 to the load transducer 13, making the adjustment faster and saving time and labor. On this basis, the two wedge blocks 14 may be further provided with power apparatuses 13, an output end of each power apparatus 13 is in contact with an end portion of one of the wedge blocks 14, and a fixed end of the power apparatus 13 is connected to the other wedge block 14. The power apparatus 13 applies a force to play an auxiliary role. In addition, the power apparatus 13 may be further connected to an external controller to implement intelligent adjustment, which is more efficient and faster.

In a2, after the horizontal or lateral force applied by the power apparatus 13 is released, a vertical load of an upper member (beam body) completely acts on the force measurement apparatus. Since the sensing apparatus 5 is adjusted to be tightly attached to the load transducers 3 by means of the wedge blocks 14, there is no gap between the two load transducers 3. Under the vertical load on the force measurement apparatus, relative displacement between the two load transducers 3 will not occur again. At this time, the height of a height-adjustment apparatus is kept unchanged, and the sensing apparatus 5 between the two load transducers 3 measures the horizontal or lateral force value more accurately.

Embodiment 9

For a1 in A1, another structure is adopted in this embodiment to implement the method of the present invention. In this embodiment, a contact surface between the bearing core 1 and the load transducer 3 is an oblique straight surface, and a bottom surface of the bearing core 1 is configured to have a V shape. A contact surface between the load transducer 3 and a lower seat plate 15 is a planar surface. A plurality of sensing apparatuses 5 are located between the load transducer 3 and a side wall of the lower seat plate 15 in a horizontal direction, and the lower seat plate 15 is of a basin cavity structure. A vertical force applied to the bearing core 1 is decomposed by the load transducer 3 into horizontal components, so that the sensing apparatuses 5 are pressed, and the sensing apparatuses 5 record the horizontal or lateral force values at this time.

A power apparatus 13 is installed on either side wall of the lower seat plate 15, and an output end of the power apparatus 13 passes through the side wall of the lower seat plate 15 and is in direct or indirect contact with the sensing apparatuses 5. The power apparatus 13 applies a horizontal force such that the sensing apparatuses 5 are pressed. The power apparatus 13 may implement power output in the form of a hydraulic cylinder or a pneumatic cylinder. The two load transducers 3 move close to each other to jack up the bearing core 1. A value of the horizontal or lateral force applied to the sensing apparatuses 5 is recorded when a height of the bearing core 1 starts to change or the change is paused. A relational expression of a coefficient of friction, an angle of inclination of the load transducers 3 and a horizontal or lateral force is derived according to a mechanical equilibrium relationship between forces applied to the wedge-shaped load transducers 3, and a value of the coefficient of friction is calculated according to the relational expression.

A load distribution baffle 17 is arranged between the output end of the power apparatus 13 and the sensing apparatuses 5, the output end of the power apparatus 13 is in contact with a side face of the load distribution baffle 17, and the sensing apparatuses 5 are located between the load distribution baffle 17 and the respective load transducer 3. With the load distribution baffle 17, the number of power apparatuses 13 used can be reduced. In this embodiment, three sensing apparatuses 5 are provided, and three power apparatuses 13 are correspondingly used. It is also possible that one or two power apparatuses 13 correspond to the three sensing apparatuses 5. An adjustable limiting block 16 is installed between the load distribution baffle 17 and the side wall of the lower seat plate 15.

Embodiment 10

Figure 19:
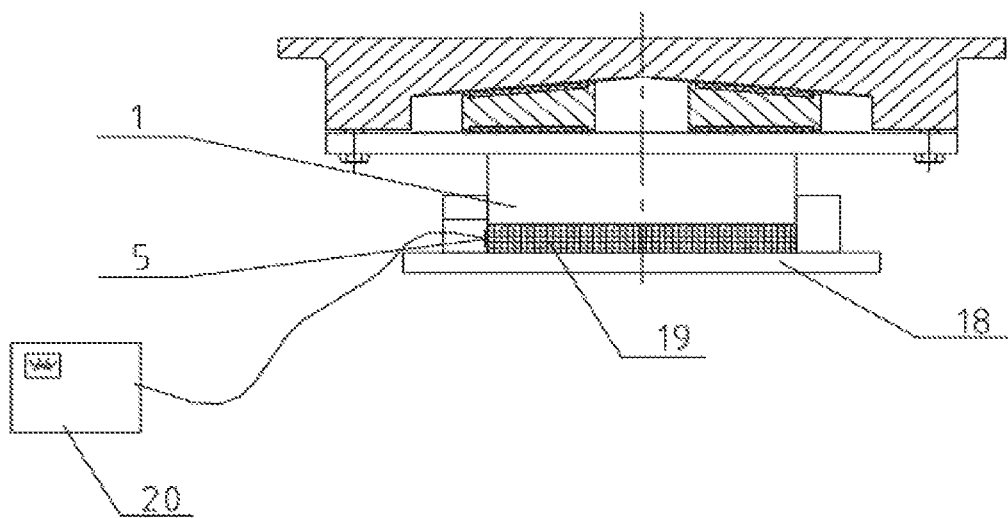
FIG. 19 is a schematic structural diagram of Embodiment 10.

As shown in FIG. 19, in this embodiment, the bearing core is placed in a bottom basin having a basin cavity 18 structure, a force measurement carrier 19 is arranged between the bearing core 1 and the bottom basin 18, and a sensing apparatus 5 is arranged on a side face of the force measurement carrier 19. A signal line of the sensing apparatus 5 passes through a mounting hole in a side wall of the bottom basin 18 and is connected to an external data acquisition system 20, and the data acquisition system 20 is configured to monitor a vertical supporting force of a support apparatus. An electric signal generated when the sensing apparatus 5 is subjected to a horizontal pressing force is transmitted through a wireless or wired network to the data acquisition system 20 for collection, analysis and processing to measure the load, and a vertical load is obtained reversely through mechanical equilibrium decomposition on the load transducers 3, so as to achieve the purpose of force measurement. The data acquisition system 20 includes a demodulator and a computer system (known in the prior art). An input end of the demodulator is connected, via a signal line, to the sensing apparatus 5 installed on the force measurement carrier 19, and an output end of the demodulator is connected to the computer system through a wireless network or a wired network. The computer system is further provided with a real-time monitoring and alarm system. The sensing apparatus 5 senses a pressure stress change of the force measurement carrier 19 and outputs a pressure wavelength signal to the demodulator by means of the signal line. After analyzing and processing the wavelength signal, the demodulator transmits the signal through the wireless network or the wired network to the computer system for processing, and then an actual load of the bearing is visually displayed and compared with a normal service load of the bearing. An alarm is given in the case of an abnormality, so as to monitor the load of the bearing from a long distance, and data of the force applied to the bearing is acquired in real time.

Those described above are only the preferred embodiments of the present invention, and are not intended to limit the present invention in any form. Any simple modifications, equivalent replacements, improvements, etc. made to the above embodiments within the spirit and principle of the present invention based on the technical essence of the present invention still fall within the scope of protection of the technical solutions of the present invention.

What is claimed is:

1. A method for calibrating an in-service bridge force-measurement bearing on the basis of accurate determination of a coefficient of friction, characterized by comprising the following steps:

A1: recording a value of a horizontal or lateral force applied to a force measurement apparatus, this step comprising three situations of a1, a2, and a3:

a1: first recording a horizontal or lateral force value of a sensing apparatus (5) before the force measurement apparatus is lifted; and then applying, by a power apparatus (13), a horizontal or lateral force to two wedge-shaped load transducers (3) on the force measurement apparatus to change a height of the force measurement apparatus, and recording a horizontal or lateral force value of the sensing apparatus (5) during the change in height or during a pause in the change;

a2: first applying a horizontal or lateral force to two wedge-shaped load transducers (3) on the force measurement apparatus to change a height of the force measurement apparatus, and recording a horizontal or lateral force value of a sensing apparatus (5) during the change in height or during a pause in the change; then accurately adjusting a gap between the two load transducers (3), to tightly attach the sensing apparatus (5) to the load transducers (3); and releasing a power apparatus (13), and recording a horizontal or lateral force value measured by the sensing apparatus (5) between the two load transducers (3) at this time; and a3: first applying a horizontal or lateral force to two wedge-shaped load transducers (3) to change a height of the force measurement apparatus, and recording a horizontal or lateral force value of a sensing apparatus (5) during the change in height or during a pause in the change; and then reducing the value of the horizontal or lateral force applied to the two wedge-shaped load transducers (3) to change the height of the force measurement apparatus, and recording a horizontal or lateral force value of the sensing apparatus (5) during the change in height or during a pause in the change;

A2: deriving a relational expression of a coefficient of friction, an angle of inclination of the load transducers (3) and a horizontal or lateral force according to a mechanical equilibrium relationship between forces applied to the load transducers in a1 or a2 or a3; and A3: calculating a value of the coefficient of friction according to the horizontal or lateral force values recorded in a1 or a2 or a3 and the relational expression in A2.

2. The method for calibrating an in-service bridge force-measurement bearing on the basis of accurate determination of a coefficient of friction according to claim 1, characterized by further comprising step A4: deriving a relational expression of a vertical force, the angle of inclination of the load transducers (3), the horizontal or lateral force and the coefficient of friction according to the mechanical equilibrium relationship between the forces applied to the load transducers (3) in a1 or a2 or a3, and accurately calculating a vertical force value of the force measurement apparatus in combination with the value of the coefficient of friction obtained in A3.

3. The method for calibrating an in-service bridge force-measurement bearing on the basis of accurate determination of a coefficient of friction according to claim 1, characterized in that in a1 and a2, the force measurement apparatus used comprises an upper adjusting plate (6) and a lower adjusting plate (8), a bearing core (1) is arranged above the upper adjusting plate (6) or below the lower adjusting plate (8), a bottom surface of the upper adjusting plate (6) is provided with an adjusting chamber (9), the two wedge-shaped load transducers (3) are arranged in the adjusting chamber (9), one or more sensing apparatuses (5) are arranged between the two load transducers (3), the force measurement apparatus is provided with the power apparatus (13), an output end of the power apparatus (13) is connected in series to the sensing apparatus(es) (5) and is then in contact with a side portion and/or an end portion of one of the load transducers (3), a fixed end of the power apparatus (13) is connected to a side portion and/or an end portion of the other load transducer (3), the power apparatus (13) outputs a horizontal or lateral force to push the two load transducers (3) away from each other, so that power output is paused when a height of the upper adjusting plate (6) rises to a set elevation, and at this time, the value of the horizontal or lateral force applied by the power apparatus (13) is capable of being directly measured by the sensing apparatus(es) (5) connected in series to the output end.

4. The method for calibrating an in-service bridge force-measurement bearing on the basis of accurate determination of a coefficient of friction according to claim 3, characterized in that a limiting apparatus(es) is/are provided on one side or two sides of each sensing apparatus, each limiting apparatus is an adjusting screw (10), and the adjusting screw (10) is in threaded connection with the corresponding load transducer (3); in step a2, after the power apparatus (13) relatively moves the two load transducers (3) away each other, the height of the force measurement apparatus rises to a set elevation, and a gap is formed between the two load transducers (3); and by means of the adjusting screw (10), the sensing apparatus (5) is adjusted to be tightly attached to the load transducers (3), and after the horizontal or lateral force applied by the power apparatus (13) is released, the sensing apparatus (5) between the two load transducers (3) accurately measures the horizontal or lateral force value at this time.

5. The method for calibrating an in-service bridge force-measurement bearing on the basis of accurate determination of a coefficient of friction according to claim 3, characterized in that a locking apparatus (11) is arranged between the sensing apparatus (5) and the adjusting screw (10), and the locking apparatus (11) is a steel plate, section steel, round steel, angle steel, a steel pipe, or a concrete block.

6. The method for calibrating an in-service bridge force-measurement bearing on the basis of accurate determination of a coefficient of friction according to claim 3, characterized in that two ends of the sensing apparatus (5) are provided with matching fixing seats (12), the fixing seats (12) are located between the sensing apparatus (5) and the limiting apparatus, and one or more groups of fixing seats (12) are provided.

7. The method for calibrating an in-service bridge force-measurement bearing on the basis of accurate determination of a coefficient of friction according to claim 3, characterized in that the limiting apparatus is two wedge blocks (14), inclined surfaces of the two wedge blocks (14) match and are attached to each other, and by means of mutual sliding of the two wedge blocks (14), the sensing apparatus (5) is adjusted to be tightly attached to the load transducers (3).

8. The method for calibrating an in-service bridge force-measurement bearing on the basis of accurate determination of a coefficient of friction according to claim 3, characterized in that the bearing core (1) is placed in a bottom basin (18) having a basin cavity structure, a force measurement carrier (19) is arranged between the bearing core (1) and the bottom basin (18), a sensing apparatus (5) is arranged on a side face of the force measurement carrier (19), and the sensing apparatus (5) is connected to an external data acquisition system (20) via a signal line.

9. The method for calibrating an in-service bridge force-measurement bearing on the basis of accurate determination of a coefficient of friction according to claim 1, characterized in that a1 in A1 is implemented by means of another structure in which the force measurement apparatus comprises a bearing core (1), a lower seat plate (15), and two load transducers (3), wherein a bottom surface of the bearing core (1) is in contact with top surfaces of the two load transducers (3) in the form of an oblique straight surface or a cylindrical surface or a curved surface, a plurality of sensing apparatuses (5) are arranged between each load transducer (3) and a side wall of the lower seat plate (15) in a horizontal direction, and the sensing apparatuses (5) record horizontal or lateral force values.

10. The method for calibrating an in-service bridge force-measurement bearing on the basis of accurate determination of a coefficient of friction according to claim 8, characterized in that a power apparatus (13) is installed on either side wall of the lower seat plate (15), and an output end of the power apparatus (13) passes through the side wall of the lower seat plate (15) and is in direct or indirect contact with the sensing apparatuses (5); the power apparatus (13) applies a horizontal or lateral force such that the sensing apparatuses (5) are pressed and the two load transducers (3) move close to each other to jack up the bearing core (1); a value of the horizontal or lateral force applied to the sensing apparatuses (5) is recorded when a height of the bearing core (1) starts to change or the change is paused; a load distribution baffle (17) is arranged between the output end of the power apparatus (13) and the sensing apparatuses (5), the output end of the power apparatus (13) is in contact with a side face of the load distribution baffle (17), and the sensing apparatuses are located between the load distribution baffle (17) and the respective load transducer (3); and an adjustable limiting block (16) is installed between the load distribution baffle (17) and the side wall of the lower seat plate (15).

* * * * *